UNITED STATES PATENT OFFICE.

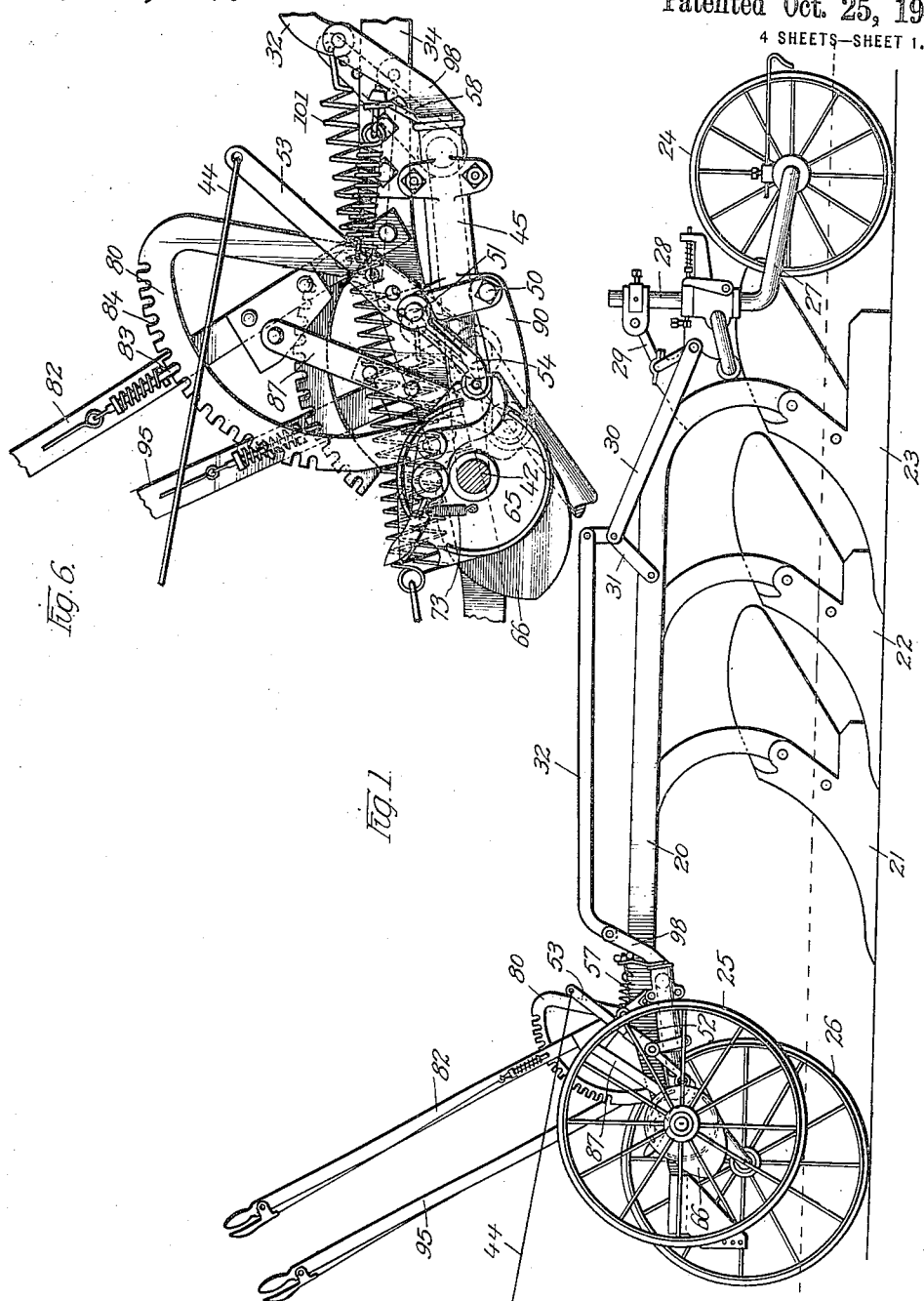

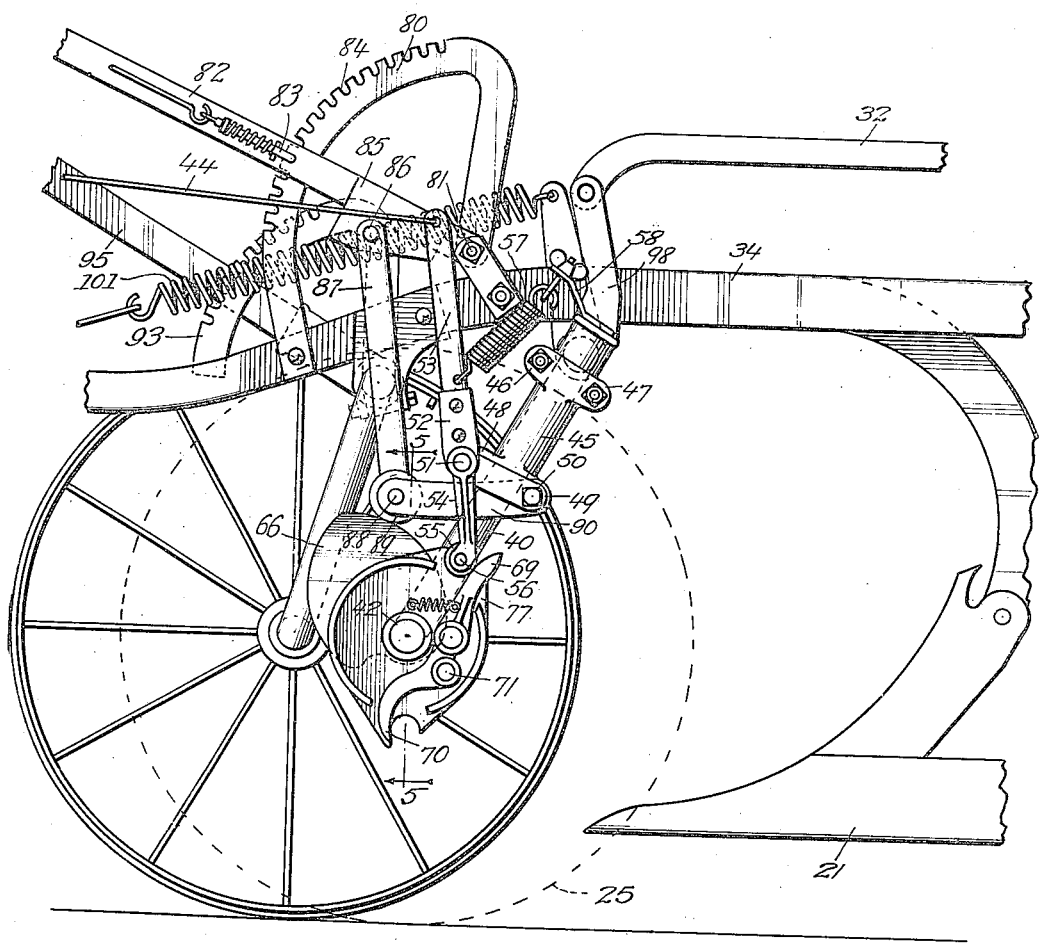
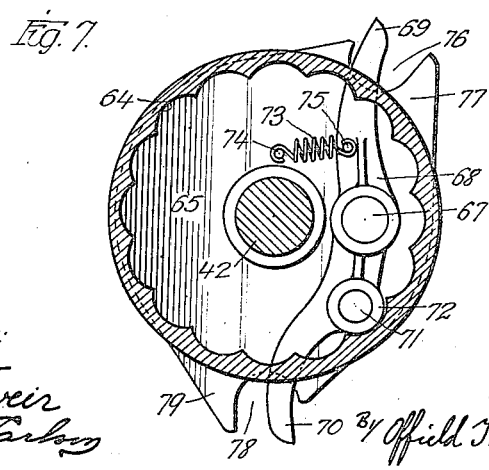

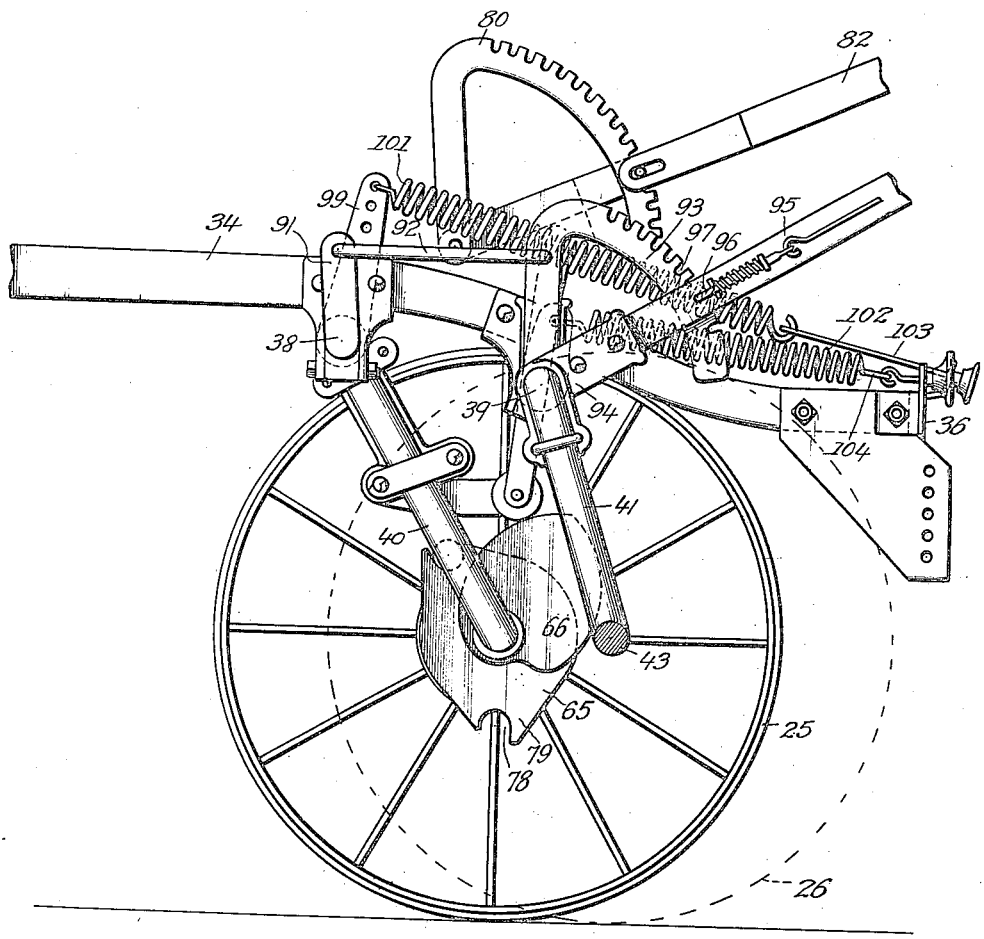

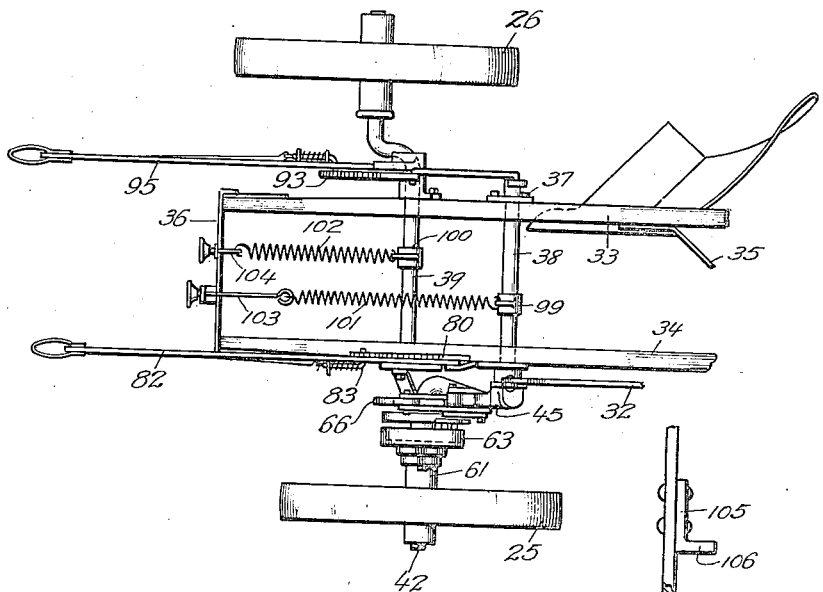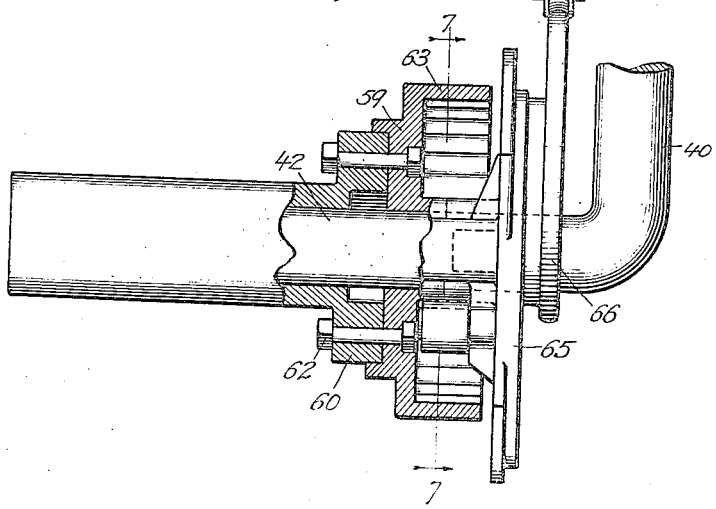

HENRY S. SMITH, OF DIXON, ILLINOIS, ASSIGNOR, BY MESNE ASSIGNMENTS, TO J. I. CASE THRESHING MACHINE COMPANY, OF RACINE, WISCONSIN, A CORPORATION OF WISCONSIN.

PLOW-LIFT.

1,394,767.         Specification of Letters Patent.         Patented Oct. 25, 1921.

Application filed December 14, 1918. Serial No. 266,660.

*To all whom it may concern:*

Be it known that I, HENRY S. SMITH, a citizen of the United States, residing at Dixon, in the county of Lee and State of Illinois, have invented certain new and useful Improvements in Plow-Lifts, of which the following is a specification.

My invention relates to improvements in plow lifts, has has special reference to a type of plow lift similar to that which is disclosed in United States Letters Patent to Graham, No. 1,237,505.

The principal objects of the invention are to provide a simple, practical, and efficient plow lift of the character referred to.

In the drawings accompanying this application, which disclose a preferred embodiment of my invention,—

Figure 1 is a side elevation of the plow with the bottoms dropped into operative position;

Fig. 2 is a fragmentary enlarged view of a portion of Fig. 1 showing the frame of the plow raised to hold the plow bottoms out of operative position;

Fig. 3 is a view similar to Fig. 2, but looking from the other side of the plow;

Fig. 4 is a plan view of the front portion of the plow shown in Fig. 1;

Fig. 5 is a section taken on the line 5—5 of Fig. 2;

Fig. 6 is an enlargement of a portion of Fig. 1; and

Fig. 7 is a section taken on the line 7—7 of Fig. 5.

Referring to the drawings, it will be observed that the plow is of the fixed frame, front lift type, and comprises a main frame designated as a whole by 20 carrying a series of three bottoms 21, 22, and 23, the rear end of the frame being equipped with a vertically movable rear wheel 24 and the front end of the frame being equipped with a pair of adjustable ground wheels, 25 being the land wheel and 26 being the furrow wheel. The rear wheel 24 is rotatably mounted upon a rearwardly extending axle 27, the forward limb 28 of which is vertical and rotatable, and is capable of being moved up and down by means of a suitable bell crank lever 29. Said bell crank lever 29 is operated through a system of linkage 30, 31, and 32, it being understood that longitudinal movement of the link 32 will cause relative vertical movement of the wheel 24 and the rear end of the plow frame thereby enabling the rear bottoms to be lifted vertically a distance substantially equal to the degree of lift on the front end of the plow frame. The rear lift mechanism, which has just been described, is of well known approved construction and need not be further referred to in detail.

The principal features of the front lift arrangement, to which my invention is particularly directed, will now be described.

Referring particularly to Fig. 4, it will be seen that the forward extensions of the two plow beams 33 and 34 constitute the front end of the main frame 20, said beams being connected together by means of a suitable diagonal brace 35 and a transverse brace 36. Secured to said front beam extensions 33 and 34 are a couple of pairs of brackets, one of which is indicated at 37 in Fig. 4, said pairs of brackets furnishing pivot bearings for the horizontal parts of the axles 38 and 39. The axles 38 and 39 are formed with crank arms 40 and 41, the crank pins of which 42 and 43 constitute journals upon which the land wheel 25 and the furrow wheel 26 respectively rotate.

The land wheel 25 in its passage over the ground, furnishes the necessary power by which the frame of the plow and the bottoms carried thereby are elevated. The raising and lowering of the plows is manually controlled by means of a rope or cord 44 extending to some convenient point adjacent to the position occupied by the person driving the tractor.

Clamped around the crank arm 40 is a casting 45, the upper portion thereof having a pair of lugs 46 and 47 for receiving the clamping bolts, and the lower portion having a pair of somewhat larger lugs 48 and 49 which support transversely extending pivot pins 50 and 51. The pivot pin 51 constitutes a pivotal support for a small control lever 52 which has an arm extension 53, to the upper end of which the control cord 44 is connected. The end 54 of said control lever 52 extends downwardly beyond the pivot pin 51 and is equipped with a small roller 55 running on a pivot 56. Normally the upper end 53 of the control lever 52 is carried rearwardly by means of a coil spring 57, the front end of which is connected to the extension 53 and the rear end is adjustably connected to a small bracket 58 secured to the top of the crank arm bracket 45.

The clutch mechanism details are shown best in Figs. 5 and 7. In said figures, 59 represents a constantly running clutch element which is rigidly secured to a flange 60 and the hub 61 of the land wheel 25 by means of a series of suitable bolts 62. Said constantly running clutch element 59 is formed with an annular flange part 63, the inner periphery of which is shaped to provide a series of circular depressions 64. Loosely mounted upon the inner end of the crank pin 42 is a clutch plate 65 to which is rigidly secured a cam 66. On the outer face of said clutch plate 65 is an integral stud 67 upon which is pivotally mounted a clutch dog 68. Said clutch dog 68 is formed with a pair of upwardly extending trip fingers 69 and 70 and also carries on an integral stud 71, a roller 72, said roller 72 being of suitable diameter to fit the circular depressions 64 previously referred to. A coil spring 73 connected between pins 74 and 75, carried respectively by the clutch plate 65 and the dog 68, tends to force the roller 72 outwardly into engagement with the depressions 64 of the constantly running clutch member 59. Said spring 73 is effective to engage the clutch roll 72 with the depressions 64 whenever the clutch fingers 69 and 70 are not locked to prevent such tendency, such locking of the clutch fingers 69 and 70 being effected by the control roll 55, heretofore referred to.

Describing the operation of the clutch mechanism, it will be observed, by reference to Fig. 2, that when the plows are in raised position, the roll 55 is in engagement with the finger 69 and is seated in a semi-circular depression 76 cut in a projecting portion 77 of the clutch plate 65. In such position it will be seen, by referring to said Fig. 2, that the roll 55 causes the clutch dog 68 to swing against the contrary tendency of the spring 73 into such position that the clutch roll 72 does not engage the depressions 64 in the constantly running clutch member 59, which revolves idly with the land wheel 25. Similarly, when the plows are in their depressed position, the clutch roll 55 will engage the other end 70 of the clutch dog 68 and seat itself in a similar semi-circular depression 78 in a projection 79 on the opposite side of the clutch plate 65. By reference to Fig. 7, it will be seen that the amount of angular movement of the clutch plate 65 required to effect the lowering of the plows is considerably less than one-half of a revolution, while the outward movement corresponding to a raising movement of the plows is considerably greater than one-half of a revolution of the clutch plate. This difference in the angular movement is for the express purpose of relieving the stress on the various parts when the plows are being raised by distributing the load over a greater time interval.

I will now describe the means by which the cam 66 effects the raising and lowering of the plows. Referring to Figs. 2 and 4, 80 represents a notched segment rigidly secured to the front end of the plow beam 34. On the pivotal point 81 of said sector arm 80 there is mounted an adjustable hand lever 82 equipped with a suitable spring-pressed dog 83 arranged to coöperate with any one of the sector arm notches 84 to maintain said hand lever 82 in any desired position of adjustment relative to said sector arm 80. On the lower end of said hand lever 82 is a small plate 85 to which, by means of a pin 86, there is pivotally connected a downwardly extending link 87. The lower end of said link 87 carries a transverse pin or stud 88 which furnishes both a bearing for the cam roll 89 and a pivotal connection between the lower end of said link 87 and a pair of twin curved links 90. The rear ends of said twin curved links 90 are suitably apertured to pivotally connect with the pivot pin 50 heretofore referred to.

The link 87 and the twin curved links 90 constitute in effect a toggle connection between the fixed frame 34 and the crank arm 40. It will be manifest that when the plows are in their depressed position, as shown in Figs. 1 and 6, the cam 66 when rotated will engage the cam roll 89 and force the same upward, applying pressure to the pivotal connection between the links 87 and 90. The curvature of the cam 66 and the dimensions and arrangement of the links 87 and 90 are suitably coördinated so that the lifting effort necessary to raise the plows out of the ground and into the position shown in Fig. 2, is distributed over the entire lifting movement, in accordance with the total amount of power available for effecting such lifting. As has been previously stated, the total lifting movement is distributed over a time interval corresponding to considerably more than one-half of a revolution of the land wheel 25, which of course corresponds to a longitudinal movement of the plow over the ground for a distance of several feet. The distance of vertical movement of the plow frame being comparatively slight in comparison with the travel of the plow as a whole during such lifting movement, and by reason of such lifting being effective without jerks or sudden demands for excessive amounts of power at any period of the movement, it will be seen that the traction derived from the land wheel alone will be amply sufficient to provide the necessary power for effecting the elevation of the plow frame with its bottoms.

The elevation of the other side of the plow frame, which is supported by the furrow wheel 26, is effected by the following mechanism: Referring particularly to Fig. 3, it will be seen that on the end of the land wheel axle 38 there is formed an upwardly projecting arm 91 which, by means of a link rod 92, is connected to a sector arm 93 loosely mounted upon the axle 39 of the furrow wheel. On said furrow wheel axle 39, and adjacent the crank arm 41, there is rigidly secured a socket 94 in which is rigidly mounted a hand lever 95, said hand lever being equipped with the usual spring-pressed dog 96 arranged to coöperate with any one of the notches 97, whereby said hand lever 95 may be locked to said sector arm 93 and moved as a unit therewith. It will be manifest that when the crank arm 40 of the land wheel 25 swings downwardly in order to raise the plow frame, the crank arm 41 of the furrow wheel will also be actuated in a similar direction by means of the link rod 92 and associated parts just described. The hand lever 95 of course enables the furrow wheel 26 to be adjusted independently of the land wheel 25 whenever it becomes necessary to level the plows transversely.

The tail end of the plow is raised through the agency of the link 32, previously described, by means of an extension arm 98 rigidly secured to the top of the crank arm bracket 45. It will be manifest that when the axle 38 is rotated to raise the front end of the plow, the arm 98 will exert a pull upon the link 32, thereby simultaneously elevating the rear end of the plow frame. Although the rear end of the plow may be said to move simultaneously with the front end of the plow, as a matter of fact, by reason of a certain amount of slack or lost motion permanently present in the connections of the linkage 32, 31, 30, and 29, the front end of the plow commences its upward movement slightly in advance of the tail end of the frame. This causes the bottoms to point upward slightly while they are being raised, and hence materially assists the power lift mechanism in hoisting them out of the ground.

In order still further to take the load off the power lift mechanism, especially during the initial portion of the lifting movement, I prefer to equip the axles 38 and 39 with a pair of upstanding arms 99 and 100 rigidly keyed to said axles and having their upper ends connected to the front cross-piece 36 of the plow frame by means of strong coil springs 101 and 102, said springs being adjustable by means of hand-controlled screws 103 and 104.

Referring to Fig. 5, it will be observed that there is secured to the vertical link 87 a small plate 105 having at its lower end a turned-in lug 106. The purpose of said lug 106 is to engage and rest upon the crank arm 40 when the plows are in the ground, thereby definitely locating the position of the frame with reference to the land wheel, while at the same time taking the pressure off the cam roll 89 and cam 66.

By reference to Figs. 3 and 2 it will be observed that when the plows are raised, the cam has moved into such position that the cam roll 89 has passed beyond the point of the cam, this condition being effective to prevent reverse or improper movements of the power lift mechanism for any cause.

It will be observed that the lifting effect of the mechanism is accomplished by a comparatively small number of operative parts and through the medium of a toggle action, the arrangement being such that the power is applied in a simple, positive, and direct manner, so that relative movement of the frame and of the wheels, caused by the movement of the plow over rough uneven ground, is reduced to a minimum. It will be noted that the weight of the frame is carried directly upon the axle itself instead of having to act through a more or less flexible and loosely jointed train of mechanism, as in some other constructions.

The described details of the mechanism are merely illustrative of one specific application of my invention, the scope of which should be determined by reference to the appended claims.

I claim—

1. Power lift mechanism for agricultural implements, comprising a main frame, an earth-turning body mounted on said frame, a ground wheel for supporting said frame, an arm having one end pivotally mounted in said frame and having the other end provided with means rotatably securing said ground wheel, a link pivotally connected at one of its ends to said frame, a second link pivotally connected at one of its ends to said arm, the other ends of said links being pivotally connected together, and means actuated by said ground wheel for applying force to said links for rocking said arm in said frame to elevate the latter.

2. Agricultural implement power lift mechanism comprising, in combination, a main frame, an earth-turning body rigidly mounted on said main frame, a ground wheel for supporting one end of said frame, a crank arm having its upper end journaled in said frame and having its lower end provided with means rotatably supporting said ground wheel, a link having its upper end pivotally connected to said frame, a second link having one end pivotally connected to an intermediate point in the length of said crank arm, means pivotally uniting together the other ends of said links, and power lift mechanism operated by the movement of said ground wheel over the ground for exerting an upwardly acting force on said uniting means to elevate the end of said frame.

3. Agricultural implement power lift mechanism comprising, in combination, a main frame, an earth-turning body rigidly mounted on said main frame, a ground wheel for supporting one end of said frame, a crank arm having its upper end journaled in said frame and having its lower end provided with means rotatably supporting said ground wheel, a link having its upper end pivotally connected to said frame, a second link having one end pivotally connected to an intermediate point in the length of said crank arm, means pivotally uniting together the other ends of said links, a revoluble member, manually-controlled clutch mechanism for connecting said revoluble member with said wheel and effecting predetermined rotary movements thereof, and cam means carried by said revoluble member for exerting upward pressure upon the lower end of said first link, thereby to raise the end of said frame.

4. The combination of a plow frame, a ground wheel, a ground wheel support pivoted on the frame and oscillatable to raise and lower the frame, a toggle joint interposed between the frame and said support, and adjusting means engaging the toggle joint intermediate the ends thereof and having a clutch connection with the ground wheel for adjusting the toggle joint to raise and lower the frame.

5. A power lift mechanism for plows comprising a main frame, a plow bottom mounted on said frame, a ground wheel for supporting the frame, a crank arm journaled in the frame and having the ground wheel rotatably mounted on the lower end thereof, a radial cam co-axial with said ground wheel, means engaging the cam for adjustment thereby to raise and lower the frame, clutch mechanism for connecting the cam to operate with the ground wheel and means acting automatically to release the clutch when the cam has passed slightly beyond its lift movement and lock the cam against reversed movement.

6. Power lift mechanism for agricultural implements comprising a main frame, an earth-turning body mounted on said frame, a ground wheel for supporting said frame, an axle journaled in said frame and provided with a crank arm, the other end of which rotatably supports the wheel, a link having one of its ends pivotally connected to the frame, means actuated by the wheel for applying force to the other end of said link to raise the frame and swing said axle relative to the frame, and means linking said link to a point on said axle spaced from the axis of the latter.

7. The combination of a plow frame, a ground wheel, a ground wheel support pivoted on the frame and oscillatable to raise and lower the frame, an adjusting lever on the frame, toggle links connecting said lever with the ground wheel support and power lift mechanism engaging one of the toggle links at a distance from the outer end thereof and having a clutch connection with the ground wheel for adjusting the toggle links to raise and lower the frame.

HENRY S. SMITH.